INVENTOR.
Arnold A. Winslow
HIS ATTORNEY.

Feb. 4, 1958 A. A. WINSLOW 2,822,135
THERMOSTATIC REGULATOR
Filed Jan. 4, 1955 2 Sheets-Sheet 2

INVENTOR.
Arnold A. Winslow
BY
HIS ATTORNEY.

# United States Patent Office 2,822,135
Patented Feb. 4, 1958

2,822,135

THERMOSTATIC REGULATOR

Arnold A. Winslow, Greensburg, Pa., assignor to Robertshaw-Fulton Controls Company, Greensburg, Pa., a corporation of Delaware Application January 4, 1955, Serial No. 479,759

17 Claims. (Cl. 236—99)

This invention relates to thermostatic regulators for fluid fuel burning appliances and more particularly to thermostatically actuated fuel regulating valves.

In devices of this character, a power element is utilized to operate a valve member in response to temperature variations. It has been customary in such devices to provide a yieldable connection, including a spring member, between the power element and the valve member to allow "override" movement by the power element when the valve member is in one controlling position and another spring member for biasing the valve member to another controlling position.

It has been proposed to incorporate in a thermostatic control device, a means whereby one spring member will act in cooperation with other parts to accomplish both of the above-described functions.

It is an object of this invention to incorporate a means whereby one spring member will act in cooperation with another means to provide biasing of the valve member to a controlling position and serve as an "override" spring when the valve member is in another controlling position.

Another object of this invention is to incorporate a lever system for multiplying movement by the power element and to act in cooperation with a spring for biasing the valve member to a controlling position.

Another object of this invention is to improve thermostatic regulating devices by reducing the number of operating parts and affording increased simplicity of construction.

In the preferred embodiment of this invention, a power element is operatively connected to a lever system which multiplies movement by the power element and is operatively connected to a valve operating member by a yieldable connection which permits movement by the lever when a valve member is in one controlling position but serves to bias the valve member to another controlling position.

Other objects and advantages will appear from the following specification taken in connection with the accompanying drawings wherein.

Figure 1:
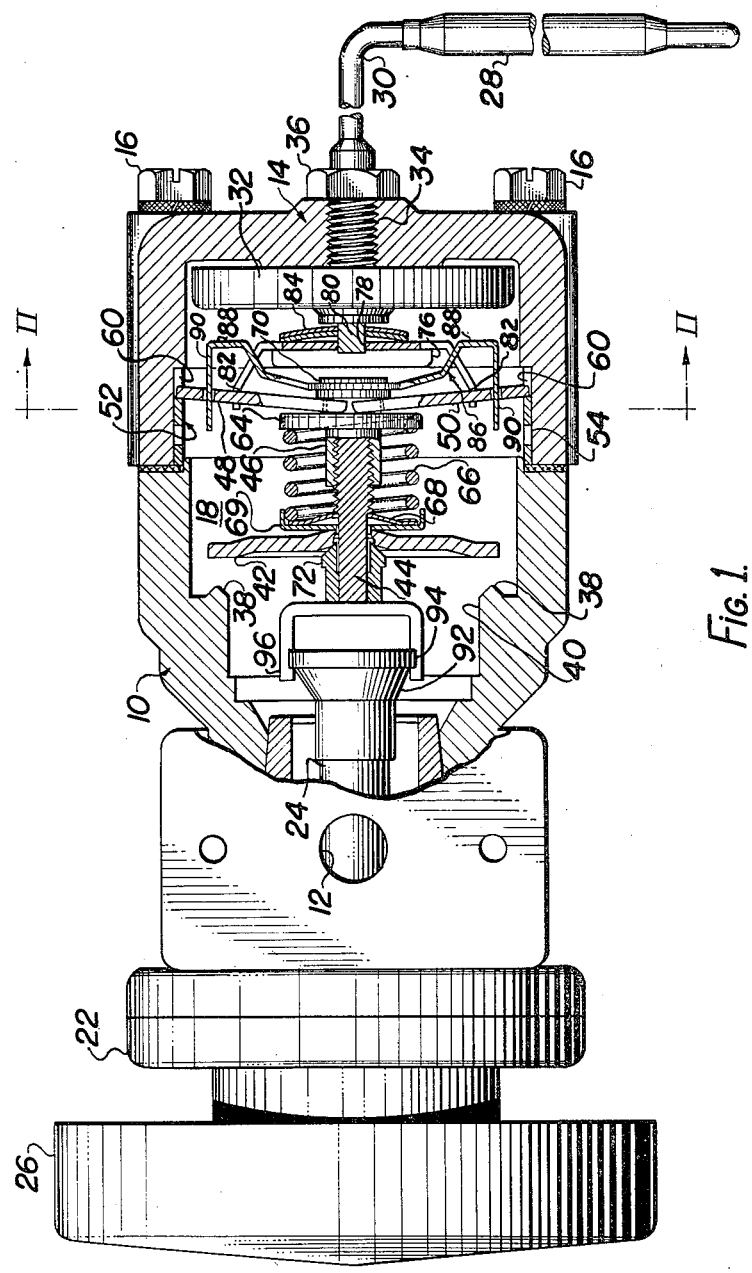
Fig. 1 is an elevation, partly in section, of a thermostatic control device embodying the invention.
Figure 2:
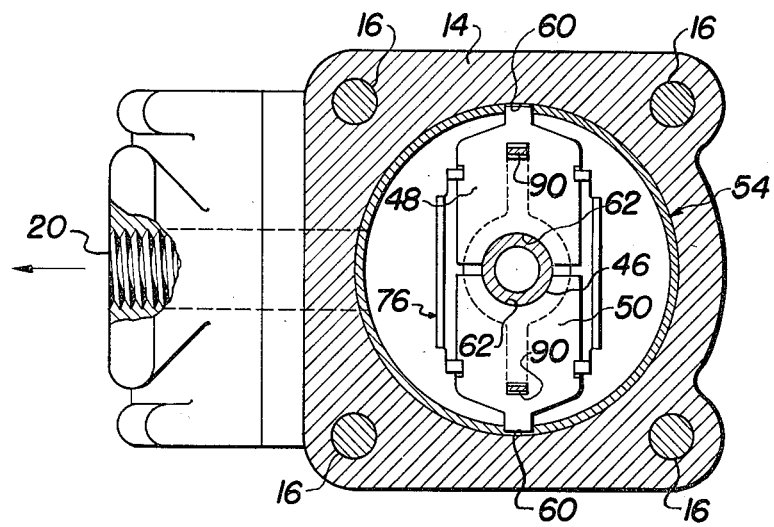
Fig. 2 is a section taken on the line II—II of Fig. 1.
Figure 3:
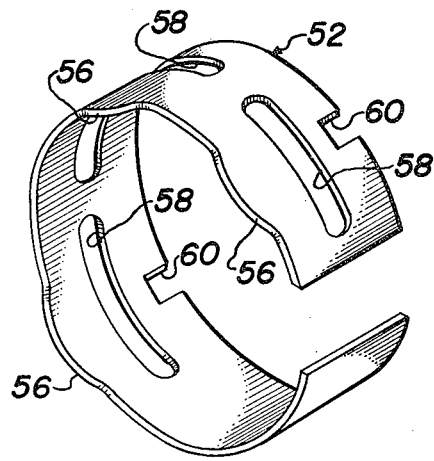
Fig. 3 is a perspective view of a detail.

Referring more particularly to the drawings, the thermostatic control device includes a main casing 10 provided with an inlet 12 for fluid fuel, and having an end casing 14 detachably secured thereto by screws 16. The end casing 14 is generally cup-shaped and forms, with the interior of the main casing 10, a valve chamber 18 which communicates with inlet 12 and an outlet 20. The end of the main casing 10 opposite the end casing 14 carries a cap 22 forming a support for an operating shaft 24 and the usual dial 26. The thermostatic device, thus far described, is designed to be housed behind the front panel of a domestic gas range with the dial 26 projecting through such panel for convenient operation. The thermal control assembly for the device in this arrangement comprises a bulb 28 which is adapted to be located in the oven of the range and connected through a capillary tube 30 to the interior of an expansible and contractible power element 32 disposed within the end casing 14.

As is customary in devices of this type, the power element 32 carries a hollow stud 34 which extends through a suitable aperture in the bottom wall of the end casing 14. A nut 36 is threaded on the stud 34 to secure the power element 32 to the end casing 14. The assembly of the bulb 28, tube 30, and power element 32 is filled with a suitable fluid which, upon changes in temperature sensed by the bulb 28, will serve to expand and contract the power element 32 in a manner well known in the art.

An annular valve seat 38 is formed on the casing 10 within the valve chamber 18 and defines a valve port 40 through which fluid fuel may flow from the inlet 12 to the outlet 20. A disk-shaped valve member 42 is located in the valve chamber 18 to be reciprocable into and out of engagement with the valve seat 38, and is mounted on a reciprocable and rotatable valve stem 44. One end of the valve stem 44 projects through the valve member 42 and toward the power element 32 for reception in an internally threaded tubular adjusting element 46.

A plurality of levers, in this instance two, 48, 50 are contained in the valve chamber 18. The levers 48, 50 are diametrically opposed to each other and are disposed substantially normal to the axis of the power element 32 and valve seat 38. An annular element 52, seated in a recess 54 formed in the inner wall of the end casing 14, provides a pivoting means for the outer ends of levers 48, 50.

The split annular element 52 is of a larger diameter than the recess 54 provided in the end casing 14 and is adapted to be flexed to a smaller diameter and inserted in the recess 54 whereupon expansion is permitted and the element 52 biases itself into engagement with the inner wall of the end casing 14 by attempting to return to its original diameter. The annular element 52 has three raised portions 56, projecting from an end thereof. Each of the raised portions 56 has an underlying slot 58 which permits flexure of the raised portions 56 toward their respective slots 58. The raised portions 56 are adapted to extend slightly past the end of the end casing 14 when the annular element 52 is in the recess 54. Thus when the end casing 14 is attached to the casing 10, the raised portions 56 will be engaged by the end of the casing 10 and be flexed toward the slots 58, creating a biasing force which tends to force the annular element 52 toward the bottom of the recess 54. The resiliency afforded the raised portions 56 by the slots 58 compensates for variations in casing dimensions and thus eliminates the necessity for high dimensional tolerances. The notches 60 in the annular element 52 are adapted to receive the outer ends of the levers 48, 50 and permit pivoting thereof.

The inner ends of the levers 48, 50 are provided with substantially semi-circular recesses 62, 62'' which coact to define a substantially circular opening between the juxtaposed ends of the levers 48, 50 and through which the tubular adjusting element 46 extends. A washer 64 is loosely mounted on the tubular adjusting element 46 in engagement with the inner ends of the levers 48, 50 to form a seat for a spring 66 which encircles the tubular element 46 and engages a spring washer 68 mounted on the valve stem 44 and engaging a third washer 69. The spring 66 thus normally biases the valve member 42 and the inner ends of the levers 48, 50 away from each other and holds the inner ends of the levers 48, 50 in engagement with a flange 70 formed on the end of the tubular element 46 and the valve member 42 into engagement with a shoulder 72.

During normal operation, pivotal movement of the levers 48, 50 will cause movement of the assembly of the valve stem 44, valve member 42, adjusting element 46, spring 66 and washers 64, 68, 69 as a unit. However, in the event that pivotal movement of the levers 48, 50 moves the valve member 42 into engagement with the valve seat seat 38, and the levers 48, 50 are subjected ot additional pivotal movement, the valve member 42, valve stem 44 and tubular adjusting element 46 will stop while the washer 64 will continue to move with the levers 48, 50 causing compression of the spring 66 without subjecting the other parts of the apparatus to excessive stresses.

When the valve member 42 is in engagement with the valve seat 38 and the levers 48, 50 continue to pivot causing compression of the spring 66, the valve member 42 is not being biased to the shoulder 72 by the spring 66 since the levers 48, 50 are not in operative engagement with the flange 70. To prevent possible movement of the valve stem during this "override" condition, the spring washer 68, positioned between the washer 69 and the shoulder of the valve stem 44, is provided to bias the valve member 42 into engagement with the shoulder 72. The spring washer 68 thus maintains a gas tight seal between the shoulder 72 and the valve member 42 when the levers 48, 50 are in the "override" position.

The valve member 42 is biased to its open position by the spring 66 and the operative connection of the levers 48, 50 with the washer 64 and the flange 70. When the levers 48, 50 are in the positions shown, the edge of the flange 70 serves as a fulcrum for the levers 48, 50. The spring 66 is exerting a force at the inner end of the levers 48, 50 which is opposed by an equal and opposite force exerted at the fulcrum point on the flange 70. Since the force at the inner ends of the levers 48, 50 is farther from their pivoting points than the force at the fulcrum point on the flange 70, a moment is produced and the levers 48, 50 are deflected to the right causing the assembly of the valve stem 44, valve member 42, adjusting element 46, spring 66 and washers 64, 68, 69 to move axially as a unit toward the power element 32 when permitted by a thrust element later to be described.

To impart the aforementioned pivotal movement to the levers 48, 50, means is provided for connecting the medial portions thereof to the power element 32. This means is here shown as a generally U-shaped thrust element 76. The bight portion of the U-shaped thrust element 76 is provided with a centrally located aperture 78, through which a pintle 80, secured to the movable portion of the power element 32, is adapted to extend. The upturned end portions 82 of the thrust element extend respectively into engagement with the medial portions of the levers 48, 50.

A curved bimetal disc 84 is inserted between the thrust element 76 and the power element 32 which is deformable in response to variations in ambient temperatures. This deformation or warping serves to compensate for expansion or contraction of the power element resulting from temperature changes at a point remote from the bulb 28 and maintains accurate calibration of the thermostat without regard to the temperature of the atmosphere surrounding the casing 10.

It can be seen that upon expansion of the power element 32, the thrust element 76 is moved bodily toward the valve seat 38 to pivot the levers 48, 50 about the annular element 52 thereby moving the assembly of the valve stem 44, valve member 42, tubular element 46, spring 66 and washers 64, 68, 69 toward the valve seat 38. The end portions 82 of the thrust element 76 preferably engage the levers 48, 50 near the center thereof to effect amplification of the movement of the power element 32 and cause movement of the valve member 42 through approximately twice the distance through which the movable portion of the power element 32 moves.

Upon contraction of the power element 32, the assembly of the valve stem 44, valve member 42, tubular element 46 and spring 66 is moved bodily toward the power element by the biasing force produced by the spring 66 and the operative connection of the levers 48, 50 with the spring 66 and the flange 70, causing the levers 48, 50 to pivot maintaining the engagement of the thrust element 76 with the power element 32. The use of the "override" spring 66 to bias the valve member 42 to an open position is one of the main features of this invention.

To set the temperature which the control device will maintain, the effective length of the connection between the valve member 42 and the inner ends of the levers 48, 50 is adjusted. To this end, detent means comprising a flexible element 86 is secured to the end of the tubular adjusting stem 46 and provided with a pair of laterally extending curved projections 88 each of which has an upturned end portion 90 seated in suitable apertures formed in the levers 48, 50 respectively. The detent element 86 thus prevents rotation of the tubular adjusting element 52 but is capable of flexing to permit axial movement of the tubular adjusting element 52 relative to the casing 10, 14.

A slidable torque transmitting connection is provided between the valve stem 44 and the operating shaft 24. This connection is effected through a flange 92 secured to the operating shaft 24 and provided with radially extending slots 94. A pair of tongues 96 is secured to the end of the valve stem 44 opposite the threaded end thereof to extend slidably through the slots 94 in the flange 92. Thus, the dial 26 may be turned to rotate the operating shaft 24 and thereby rotate the valve stem 44 relative to the adjusting element 46. This will screw the threaded portion of the valve stem 44 into or out of the tubular adjusting element 46 to regulate the distance through which the valve member 42 must be moved to engage the valve seat 38.

In the operation of the device, the dial 26 is rotated to any desired setting. This rotation serves to screw the threaded portion of the valve stem 44 into the tubular element 46 and causes movement of the valve member 42 away from the seat 38 under the bias of the spring 66 and the action of the operative connection of the levers 48, 50 with the flange 70 and the washer 64. Fuel may then flow from the inlet 12 through the valve port 40 and through the outlet 18 to the point of use, such as the oven of a domestic gas range.

When the temperature of the oven, as sensed by the bulb 28, approaches that for which the dial 26 has been set, the power element 32 expands, forcing the thrust element 76 to move toward the valve seat 38. Movement of the thrust element 76 causes the levers 48, 50 to pivot in a clockwise direction moving the assembly of the valve stem 44, valve member 42, tubular element 46 and spring 66 toward the valve seat 38.

When the temperature sensed by the bulb 28 reaches the temperature selected by the setting of the dial 26, the valve member 42 engages the seat 38 to prevent fuel flow through the valve chamber 17. Since the ratio of movement of the valve member 42 to movement of the movable portion of the power element 32 is approximately 2:1, substantial throttling of the fuel is deferred until the expansible power element 32 is expanded to substantially the degree necessary to effect seating of the valve member 42. Thus, a substantial amount of fuel continues to flow to the oven until the control temperature is actually attained.

In the event that the power element 32 expands beyond the degree necessary to effect seating of the valve member 42, as a result of what is known in the art as "overshooting," the thrust element 76 continues to impart pivotal movement to the levers 48, 50 but such pivotal movement will cause only compression of the spring 66 which allows "override" movement of the levers 48, 50 after the seating of the valve member 42.

When the temperature sensed by the bulb 28 drops below the temperature set by the dial 26, the power element 32 contracts permitting the assembly of the valve stem 44, valve member 42, tubular element 46, and spring 66 to move toward the power element 32 by the biasing action of the spring 66 and the operative connection of the levers 48, 50 with the washer 64 and flange 70.

An important feature of this invention is the fact that the spring 66 is utilized as an "override" spring and to effect biasing of the valve member 42 to an open position.

Another feature of this invention is the fact that the levers 48, 50 not only serve to multiply the movement of the power element 32 but also cooperate with the spring 66 to effect biasing of the valve member 42 to an open position.

Although a preferred embodiment of this invention has been shown and described herein, it is to be understood that the invention is not limited to the details of construction and arrangement of parts disclosed but is to be interpreted as claimed.

It is claimed and desired to secure by Letters Patent:

1. In a thermostatic regulator for fluid fuel burning appliances the combination comprising a casing having inlet and outlet passages communicating with a valve chamber, a valve seat in said chamber, a valve member movable between positions relative to said seat for controlling fuel flow between said passages, thermally responsive means including an element movable axially relative to said valve seat and said valve member, a plurality of lever arms in said chamber for multiplying movement of said movable element, each of said lever arms being pivoted on said casing, means operatively connecting each of said lever arms to said movable element, yieldable means operatively connecting said lever arms at one end to said valve member for transmitting said multiplied movement from said lever arms to said valve member, and means including said yieldable means for biasing said valve member to one of said controlling positions.

2. In a thermostatic regulator for fluid fuel burning appliances the combination comprising a casing having inlet and outlet passages communicating with a valve chamber, a valve seat in said chamber, a valve member movable between positions relative to said seat for controlling fuel flow between said passages, a valve stem movable axially relative to said valve seat and said valve member, thermally responsive means including an element movable axially relative to said valve seat and said valve member, a plurality of lever arms in said chamber for multiplying movement of said movable element, each of said lever arms being pivoted on said casing, means operatively connecting said lever arms to said movable element, means defining a yieldable connection between the ends of said lever arms and said valve stem for transmitting said multiplied movement from said lever arms to said valve member, and means including said yieldable connection for biasing said valve member to one of said positions.

3. A thermostatic regulator as claimed in claim 2 wherein said last named means comprises fulcrum means for said lever arms established by operative engagement of said lever arms with said valve stem.

4. In a thermostatic regulator for fluid fuel burning appliances the combination comprising a casing having inlet and outlet passages communicating with a valve chamber, a valve seat in said chamber, a valve member movable between controlling positions relative to said seat for controlling fuel flow between said passages, a valve stem carried by said valve member, thermally responsive means including an element movable axially relative to said valve seat, a plurality of lever arms in said chamber, said lever arms being pivoted on said casing and disposed substantially normal to the axis of said valve seat, means operatively connecting said lever arms to said movable member, a spring member movable with said valve member and operatively engaging the same, the other ends of said lever arms being operatively connected to said spring member for transmitting movement from said movable member to said valve member, said spring member being adapted to be compressed after said valve member has been moved to one of said positions, and means including said spring member for biasing said valve member to another of said controlling positions.

5. A thermostatic regulator as claimed in claim 4 wherein said last named means includes abutment means movable with said valve stem and engageable with said lever arms intermediate the ends thereof to define fulcrums therefor.

6. A thermostatic regulator as claimed in claim 4 wherein said valve member is loosely mounted on said valve stem and including an abutment on said stem engageable with said valve member, and spring means for biasing said abutment into engagement with said valve member.

7. In a thermostatic regulator for fluid fuel burning appliances, the combination comprising a casing having inlet and outlet passages communicating with a valve chamber, a valve seat in said chamber, a valve member cooperable with said seat for controlling fuel flow between said passages, thermally responsive means including an expansible element axially aligned with said valve seat and said valve member, a valve stem movable with said valve member and extending toward said expansible element, means for biasing said valve member to one end of said valve stem, a plurality of lever arms in said chamber for multiplying movement of said expansible element, said lever arms being disposed substantially normal to the axis of said valve seat, means for pivoting said lever arms on said casing, means including a spring operatively engaging said valve member for operatively connecting said lever arms at one end to said valve stem, and means operatively connecting said expansible element to each of said lever arms.

8. In a thermostatic regulator for fluid fuel burning appliances, the combination comprising a casing having inlet and outlet passages communicating with a valve chamber, a valve seat in said chamber, a valve member cooperable with said seat for controlling fuel flow between said passages, thermally responsive means including an expansible element axially aligned with said valve seat and said valve member, a valve stem extending through said valve member and toward said expansible element, a shoulder formed on said valve stem, means for biasing said valve member to said shoulder, a plurality of lever arms in said chamber, said lever arms being disposed at an angle to the axis of said valve seat, means for pivoting one end of each of said lever arms on said casing, means on the other end of said valve stem forming an operative connection with an intermediate portion of each of said lever arms, yieldable means between said valve member and said lever arms for biasing said lever arms into operative engagement with said thermally responsive means, and means operatively connecting said expansible element to a medial portion of each of said lever arms.

9. Control apparatus comprising a first open-ended casing, control means in said casing, a second open-ended casing, lever means in said second casing, a substantially annular element seated in said second casing and defining at least one pivotal support for said lever means, said element having a yieldable portion normally projecting toward the open end of said second casing, means for connecting said first and second casings with the open ends thereof in registry, said first casing being engageable with said yieldable portion to force the same into said second casing and thereby clamp said annular element therein, and means defining an operative connection between said lever means and said control means.

10. A control apparatus as claimed in claim 9 wherein said annular element has at least one slotted portion to permit yielding of said yieldable portion upon engagement with said first casing.

11. A control apparatus as claimed in claim 9 wherein said annular element comprises a split ring, having inherent bias toward expanded condition, assuring engagement thereof with a wall of said second casing.

12. A control apparatus as claimed in claim 9 wherein said pivotal support is defined by a notch in said annular element.

13. In a thermostatic regulator for fluid-fuel burning appliances the combination comprising a casing having inlet and outlet passages communicating with a valve chamber, a valve seat in said chamber, a valve member movable between controlling positions relative to said seat for controlling fuel flow between said passages, thermally responsive means including an expansible element axially aligned with said valve seat, a rotatable valve stem axially movable with said valve member and having a threaded portion, an adjusting element threaded on said threaded portion, a detent member for preventing rotation of said adjusting element, a plurality of lever arms in said chamber, each of said lever arms being pivoted at one end on said casing and disposed substantially normal to the axis of said valve stem, an abutment on the end of said adjusting element to operatively engage and provide a fulcrum for each of said lever arms, a thrust element operatively connecting said expansible element to a medial portion of each of said lever arms, a spring member movable with said valve member and operatively engaging the same, said spring member being operatively connected to the other ends of said lever arms for transmitting movement from said movable member to said valve member, said spring member being adapted to be compressed after said valve member has been moved to one of said controlling positions and being cooperable with said abutment and said lever arms to provide biasing of said valve member to another of said controlling positions, a shoulder on said valve stem, and a second spring member for biasing said valve member to said shoulder.

14. In a control device, the combination comprising a casing having inlet and outlet passages communicating with a valve chamber, a valve seat in said chamber, a valve member movable between positions relative to said seat for controlling flow of fluid between said passages, actuating means for said valve member, a yieldable connection between said valve member and said actuating means for transmitting movement therebetween, said connection being yieldable upon engagement of said valve member with said seat, and lever means cooperable with said yieldable connection for biasing said valve member to one of said positions.

15. In a control device, the combination comprising a control member movable between controlling positions, means responsive to a condition to be controlled including an element movable in response to a change in said condition, lever means operatively connected to said element to be movable therewith, yieldable means carried by said control member operatively engaging said lever means, and fulcrum means for said lever means carried by said control member and cooperable with said yieldable means and said lever means to bias said control member to one of said positions.

16. Control apparatus comprising a first open-ended casing, control means in said casing, a second open-ended casing, lever means in said second casing, a substantially angular element seated in said second casing and defining pivotal support means for said lever means, means for connecting said first and second casings with the open ends thereof in registry, said first casing being engageable with said annular element to force the same into said second casing and thereby clamp said annular element therein when said casings are connected, and means defining an operative connection between said lever means and said control means.

17. Control apparatus comprising a first open-ended casing, a second open-ended casing, lever means in said second casing for actuating a device to be controlled, a substantially annular element seated in said second casing and defining pivotal support means for said lever means, said element having a projecting portion positioned to be engaged by the open end of said second casing when said first and second casings are connected with their open ends in registry.

References Cited in the file of this patent

UNITED STATES PATENTS

| 1,851,277 | Grayson | Mar. 29, 1932 |
| 1,897,155 | Vaughn | Feb. 14, 1933 |